United States Patent [19]
Hamburg

[11] 4,032,198
[45] June 28, 1977

[54] BEARING ASSEMBLY WITH LUBRICATION AND COOLING MEANS

[75] Inventor: Glenn W. Hamburg, Grosse Pointe Park, Mich.

[73] Assignee: Teledyne Industries, Inc., Los Angeles, Calif.

[22] Filed: Jan. 5, 1976

[21] Appl. No.: 646,872

[52] U.S. Cl. .................. 308/76; 184/104 R; 222/367; 277/59
[51] Int. Cl.² ........................................ F16C 1/24
[58] Field of Search ............ 308/76, 77; 184/6 R, 184/6.14, 104 R, 12, 61, 63; 277/DIG. 8, 56, 59; 222/367, 368

[56] References Cited
UNITED STATES PATENTS

| 2,809,078 | 10/1957 | Hartwig | 308/76 |
| 2,944,857 | 7/1960 | Schneider | 308/76 |
| 3,469,656 | 9/1969 | Benthake et al. | 308/76 |

Primary Examiner—Joseph F. Peters, Jr.
Assistant Examiner—Richard A. Bertsch
Attorney, Agent, or Firm—Gifford, Chandler, Sheridan & Sprinkle

[57] ABSTRACT

A bearing assembly with lubrication and cooling means for a bearing assembly of the type comprising an inner cylindrical ring, an outer cylindrical ring, and a plurality of bearing members disposed intermediate the inner and outer rings to permit rotation of the inner ring relative to the outer ring. An annular groove is formed around one end of the inner ring and a plurality of axial bores extend from the annular groove axially through the inner ring. At least one radial bore extends radially outward from each of said axial bores through the inner ring to provide fluid communication between the annular groove and the bearing members. In operation a lubricant, which is injected into the annular groove, flows through the axial bores in the inner ring. A portion of the lubricant is centrifugally forced through the radial bores to provide lubrication for the bearing members while the remainder of the lubricant flows through the axial bores to cool the bearing assembly. In the preferred form of the invention the radial bores are not only radially but also axially spaced apart from each other to provide a more even distribution of lubricant to the bearing members.

4 Claims, 5 Drawing Figures

BEARING ASSEMBLY WITH LUBRICATION AND COOLING MEANS

BACKGROUND OF THE INVENTION

I. Field of the Invention

The present invention relates generally to bearing assemblies and more particularly to a bearing assembly having improved lubrication and cooling means.

II. Description of the Prior Art

In order to prevent bearing failure, depending on their particular application, bearing assemblies require not only lubrication but also cooling means to prevent overheating of the bearing assembly. Accordingly many previously known bearing assemblies have been devised to function with external systems to both cool and lubricate the bearing assembly.

These previously known bearing assemblies, however, suffer the disadvantage that not only is the bearing assembly complex and therefore expensive to manufacture, but also the apparatus external of the bearing assembly is unduly complex and expensive to manufacture. Moreover in some of the previously known lubrication and cooling systems for bearing assemblies, the lubrication system is constructed and functions independently of the cooling system thereby requiring two independent external systems in order to adequately cool and lubricate the bearing assembly. The structural duplication required by separate cooling and lubrication systems also indirectly increases the costs of the bearing assembly.

A further disadvantage of the previously known lubrication systems for bearings is that such lubrication systems provided an uneven distribution of lubricant to the bearing members of the bearing assembly. With an uneven distribution of lubricant to the bearing assembly, areas of the bearing assembly tend to overheat, expand, and cause subsequent bearing failure.

SUMMARY OF THE PRESENT INVENTION

The bearing assembly of the present invention overcomes the above mentioned disadvantages of the previously known bearing assemblies by providing a bearing assembly with both lubrication and cooling means which is not only relatively inexpensive to manufacture, but also provides a more even distribution of lubricant to the bearing members than the previously known bearing assemblies.

The bearing assembly of the present invention achieves the above mentioned advantages by providing an annular groove around one end of the inner ring of the bearing assembly with a plurality of axial bores extending from the annular groove axially through the inner ring of the bearing assembly. At least one radial bore extends radially outwardly through the inner ring from each of the axial bores and, in the preferred form of the invention, the axis of at least one of the radial bores lies in each of a predetermined number of spaced and parallel planes perpendicular to the axis of the bearing assembly.

In the operation of the bearing assembly of the present invention means are provided to inject lubricant into the annular groove formed in the inner ring of the bearing assembly. The lubricant flows from the annular groove into the axial bores from where a portion of the lubricant is centrifugally forced through the radial bore in each of the axial bores to provide lubricant to the bearing members. Since the radial bores are axially spaced from each other along the inner ring, a more even distribution of lubricant to the bearing members is achieved than with the previously known bearing assemblies.

The remainder of the oil continues to flow through and is expelled from the axial bores thus removing heat from the bearing assembly. Means may be provided, as required, to collect the heated lubricant expelled from the axial bores and return the lubricant to the lubrication system.

It can thus be seen that the bearing assembly of the present invention not only provides a bearing assembly of simple and relatively inexpensive construction but also provides a combination lubricating and cooling means for the bearing assembly.

BRIEF DESCRIPTION OF THE DRAWINGS

Other advantages of the present invention will become apparent upon reference to the following detailed description when read in conjunction with the accompanying drawing wherein like reference characters refer to like parts throughout the several views, and in which.

DETAILED DESCRIPTION

Figure 1:
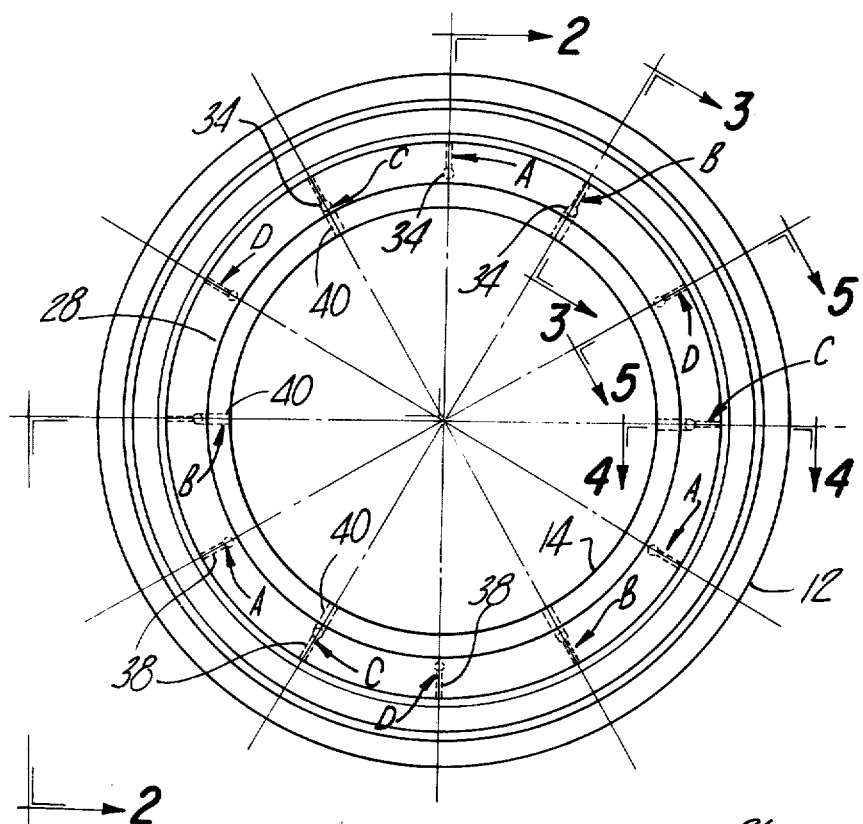
FIG. 1 is a top plan view showing the bearing assembly of the present invention.
Figure 2:
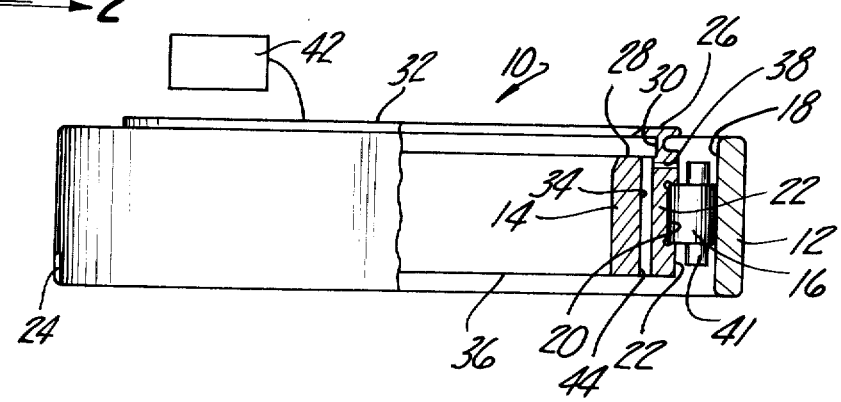
FIG. 2 is a partial cross sectional view taken substantially along line 2—2 in FIG. 1.

Referring particularly to FIGS. 1 and 2, the bearing assembly of the present invention, generally indicated by the numeral 10, is shown comprising an outer cylindrical ring 12, an inner cylindrical ring 14 and a plurality of bearing members 16 disposed intermediate the outer ring 12 and the inner ring 14. In the embodiment of the invention shown in the drawing, the bearing members 16 are conventional rollers so that the inner surface 18 of the outer ring forms one bearing race while an annular groove 20 having a rectangular cross sectional shape on the outer periphery 22 of the inner ring 14 forms the second bearing race.

An anti-rotation flat 24 is also preferably provided on the outer periphery of the outer ring 12 to prevent rotation of the outer ring 12 while permitting free rotation of the inner ring 14 along the bearing members 16. It should be understood, however, that the outer ring 12 and inner ring 14 may be designed to function with other types of bearing members 16, such as, for example, ball bearings, without deviating from either the spirit or scope of the present invention.

Figure 3:
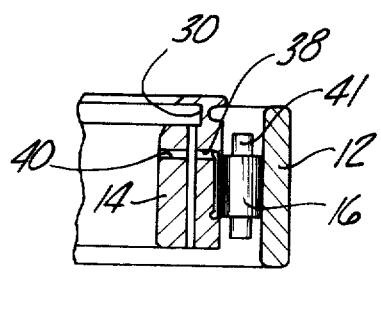
FIG. 3 is a cross sectional view taken substantially along line 3—3 in FIG. 1.

An annular lip 26 and an annular surface 28 form an annular groove 30 having a U-shaped cross sectional area at the upper edge 32 of the inner ring 14 as viewed in FIG. 2. A plurality of axial bores 34 extend through the inner ring 14 between the annular surface 28 of the groove 30 and the bottom surface 36 of the ring 14. A radial bore 38 is formed radially outward from the axial bore 34 to the outer periphery 22 of the inner ring 14. The radial bore 38 thus permits fluid communication between the annular groove 30 and the outer periphery 22 of the ring 14. As shown in FIG. 2 the radial bore 38 intersects the outer periphery 22 of the ring 14 slightly above the bearing member 16 to thereby lubricate a bearing cage 41 which slides against and separates the bearing members 16. However, in the preferred form of the present invention, the radial bores 38 are preferably axially spaced along the axial bores 34 so that the axis of at least one of the radial bores lies in each of a predetermined number of spaced and parallel planes perpendicular to the axis of the bearing assembly 10. Accordingly, as shown in FIG. 3, the radial bore 38 is spaced axially downwardly from the position shown in FIG. 2 so that the radial bore 38 intersects the upper edge of bearing member 16 to lubricate the sliding contact between the bearing members 16 and inner ring 14.

Figure 4:
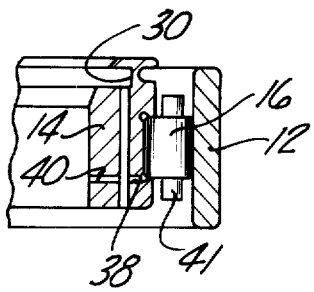
FIG. 4 is a cross-sectional view taken substantially along line 4—4 in FIG. 1.
Figure 5:
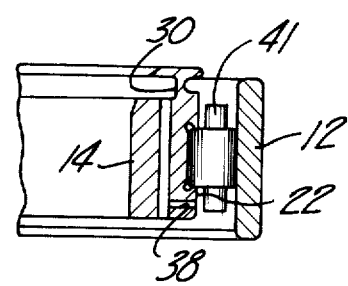
FIG. 5 is a cross-sectional view taken substantially along line 5—5 in FIG. 1.

Similarly, as shown in FIG. 4, the radial bore 38 intersects the bottom edge of the bearing member 16 while in FIG. 5 the radial bore 38 intersects the outer periphery 22 of the ring 14 at a position slightly below the bearing member 16. It should also be noted in FIGS. 3 and 4 that in order to protect the bearing surface, it is necessary to drill radially outwardly from the inside of the inner ring 14 so that access hole 40 is formed.

In the preferred form of the invention, not only are the axial bores 34 symmetrically formed around the annular surface 28, as shown in FIG. 1, but also the axial positioning of the radial bore 38 is preferably symmetrical around the inner ring 14 so that given a predetermined number N of spaced and parallel planes perpendicular to the axis of the bearing assembly 10, the axis of each Nth radial bore 38 lies in the same plane. For example, in the embodiment shown, N equals four and the radial bores 38 indicated by the letter A in FIG. 1 correspond to the axial position of the bore 38 illustrated in FIG. 2. Similarly, the bores 38 indicated by the letter B in FIG. 1 correspond to the axial position of the bores 38 shown in FIG. 3. Likewise, the bores 38 indicated by letters C and D correspond to the position of the bores 38 shown in FIGS. 4 and 5, respectively. It can thus be seen that the axis of each Nth, or fourth, radial bore 38 lies in the same plane.

The operation of the bearing assembly 10 of the present invention will now be described in detail. With the outer ring 12 secured against rotation by the anti-rotation flat 24 and the inner ring 14 free to rotate, means 42 are provided to inject a lubricant into the annular groove 30. Since the annular lip 26 of the groove 30 extends radially inwardly from the axial bores 34, the centrifugal force created by the rotation of the inner ring 14 will force the lubricant through the axial bores 34. Similarly, the centrifugal force caused by the rotation of the inner ring 14 will force a portion of the lubricant in the axial bore 34 out through the corresponding radial bore 38 thereby providing lubricant to the bearing radical bore 38 thereby providing lubricant to the bearing cage 41 and bearing members 16. Since the radial bores 38 lie in different predetermined planes, as previously described, an even distribution of lubricant is provided to the bearing members 16 and to the bearing cage 41. The even distribution of lubricant to the bearing members 16 achieved by the bearing assembly 10 of the present invention has been found to be greatly advantageous in that temperature differentials across the bearing members 16 are greatly reduced.

The remainder of the lubricant in the axial bore 34 which is not centrifugally forced through the radial bore 38 passes axially downward through the axial bore 34 and is expelled at the outlet 44 of the bore 34. As the lubricant passes axially, downwardly through the bore 34, heat is transferred from the bearing assembly 10 to the lubricant so that the lubricant expelled from the bore 34 functions to cool the bearing assembly 10. Means (not shown) may be provided to collect the lubricant expelled from the bores 34 and return the lubricant to the means 42.

It can thus be seen that the bearing assembly of the present invention provides a simple and relatively inexpensive bearing assembly having means not only to provide lubrication to the bearing cage and members, but also cooling means to remove heat from the bearing assembly. In addition, in the preferred form of the invention a more even distribution of lubricant to the bearing members than previously known is achieved thereby greatly reducing heat differentials across the bearing members and avoiding the resultant bearing failure.

Many modifications to the present invention will become apparent to those skilled in the art to which it pertains without deviating from the spirit of the invention as defined by the scope of the appended claims.

What is claimed is:
1. A bearing assembly comprising:
 a generally cylindrical inner ring, said inner ring rotating during operation of said bearing,
 a generally cylindrical outer ring disposed radially outwardly from said inner ring,
 bearing members disposed intermediate said inner ring and said outer ring and adapted to permit said inner ring to rotate relative to said outer ring,
 said inner ring having an annular groove formed therein adjacent one end, a plurality of axially extending bores formed in said inner ring and having an end communicating with said annular groove, each of said axially extending bores having a radial bore associated therewith, said radial bores being formed in said inner member having one end communicating with said associated axially extending bore and the other end opening to said bearing members whereby lubricant directed into said annular groove operation of said bearing is directed by centrifugal force through said axially extending bores and through said radial bores to said bearing.

2. The invention as defined in claim 1 wherein the axis of at least one of said radial bores lies in each of a predetermined number N of spaced and parallel planes, said planes being perpendicular to the axis of said bearing assembly.

3. The invention as defined in claim 2 wherein N is four.

4. The invention as defined in claim 3 wherein said bearing members are rollers.

* * * * *

UNITED STATES PATENT AND TRADEMARK OFFICE
CERTIFICATE OF CORRECTION

PATENT NO. : 4,032,198
DATED : June 28, 1977
INVENTOR(S) : Glenn W. Hamburg

It is certified that error appears in the above-identified patent and that said Letters Patent are hereby corrected as shown below:

Col. 3, line 55, delete "thereby providing lubricant to the bearing radical bore 38".

Signed and Sealed this

Twenty-fifth Day of October 1977

[SEAL]

Attest:

RUTH C. MASON
*Attesting Officer*

LUTRELLE F. PARKER
*Acting Commissioner of Patents and Trademarks*